United States Patent
Shimamura (10) Patent No.: US 11,226,670 B2
(45) Date of Patent: Jan. 18, 2022

(54) INFORMATION PROCESSING APPARATUS, METHOD OF CONTROLLING THE SAME, AND NON-TRANSITORY STORAGE MEDIUM STORING PROGRAM EXECUTABLE BY THE INFORMATION PROCESSING APPARATUS

(71) Applicant: BROTHER KOGYO KABUSHIKI KAISHA, Nagoya (JP)

(72) Inventor: Yasuhiro Shimamura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 245 days.

(21) Appl. No.: 16/229,286

(22) Filed: Dec. 21, 2018

(65) Prior Publication Data
US 2019/0196565 A1    Jun. 27, 2019

(30) Foreign Application Priority Data
Dec. 27, 2017   (JP) .............................. JP2017-250785

(51) Int. Cl.
| | |
|---|---|
| *G06F 1/26* | (2006.01) |
| *G06F 1/3234* | (2019.01) |
| *G06F 13/12* | (2006.01) |
| *H02J 7/00* | (2006.01) |

(52) U.S. Cl.
CPC .............. *G06F 1/325* (2013.01); *G06F 1/266* (2013.01); *G06F 13/122* (2013.01); *H02J 7/00* (2013.01); *G06F 2213/0042* (2013.01); *H02J 2207/30* (2020.01)

(58) Field of Classification Search
CPC ........ G06F 1/325; G06F 1/266; G06F 13/122; G06F 2213/0042; H02J 7/00; H02J 2207/30; H04N 1/00885; H04N 2201/0094; H04N 2201/0048; H04N 2201/001
See application file for complete search history.

(56) References Cited

U.S. PATENT DOCUMENTS

| | | | |
|---|---|---|---|
| 7,698,490 B2 * | 4/2010 | Terrell, II | G06F 13/4295 710/302 |
| 8,069,356 B2 * | 11/2011 | Rathi | G06F 1/26 713/300 |
| 9,509,361 B1 * | 11/2016 | Kuhl | H05K 5/03 |
| 10,132,697 B2 * | 11/2018 | Jefferies | G01R 21/14 |
| 10,205,325 B2 * | 2/2019 | Saunders | H02J 4/00 |
| 10,312,697 B1 * | 6/2019 | Stieber | H02J 7/007 |

(Continued)

FOREIGN PATENT DOCUMENTS

JP       2015-174373 A       10/2015

*Primary Examiner* — Aurel Prifti
(74) *Attorney, Agent, or Firm* — Scully Scott Murphy and Presser (57) ABSTRACT

An information processing apparatus includes: an interface; a battery; and a controller. The controller is configured to: determine whether a reduction notification indicating reduction in the electric power is received from an external device when the interface is receiving the electric power of a first power amount from the external device; and request the external device via the interface to supply the electric power of a second power amount that is less than the first power amount and greater than or equal to an amount of the electric power consumed in self-discharge of the battery.

17 Claims, 5 Drawing Sheets

(56) References Cited

U.S. PATENT DOCUMENTS

| | | | |
|---|---|---|---|
| 2004/0003300 A1* | 1/2004 | Malueg | G06F 1/28 713/300 |
| 2007/0145945 A1* | 6/2007 | McGinley | H02J 7/00 320/114 |
| 2008/0184042 A1* | 7/2008 | Parks | G06F 13/4072 713/300 |
| 2009/0033277 A1* | 2/2009 | Ludtke | H01M 10/4285 320/106 |
| 2009/0243549 A1* | 10/2009 | Matsumura | H01M 10/44 320/155 |
| 2009/0251008 A1* | 10/2009 | Sugaya | H02J 50/90 307/104 |
| 2010/0039081 A1* | 2/2010 | Sip | H02J 7/04 323/234 |
| 2010/0052620 A1* | 3/2010 | Wong | H02J 2207/40 320/137 |
| 2010/0180132 A1* | 7/2010 | Wu | G06F 1/325 713/300 |
| 2010/0281183 A1* | 11/2010 | Bebber | G06F 1/3287 710/5 |
| 2011/0167287 A1* | 7/2011 | Walsh | G06F 1/3209 713/323 |
| 2011/0316472 A1* | 12/2011 | Han | G06F 13/4068 320/103 |
| 2012/0078690 A1* | 3/2012 | Harriman | G06F 1/266 705/14.4 |
| 2012/0200157 A1* | 8/2012 | Ohi | H02J 7/00 307/23 |
| 2012/0210146 A1* | 8/2012 | Lai | G06F 1/266 713/310 |
| 2013/0119939 A1* | 5/2013 | Yonezawa | H02J 7/0091 320/134 |
| 2013/0166928 A1* | 6/2013 | Yang | G06F 1/3212 713/300 |
| 2013/0232349 A1* | 9/2013 | Oler | G06F 1/263 713/300 |
| 2014/0095899 A1* | 4/2014 | Sultenfuss | G06F 1/266 713/300 |
| 2014/0208134 A1* | 7/2014 | Waters | G06F 13/4282 713/310 |
| 2015/0089248 A1* | 3/2015 | Obie | G06F 1/266 713/300 |
| 2015/0095714 A1* | 4/2015 | Huang | G06F 11/221 714/43 |
| 2015/0264208 A1* | 9/2015 | Achiwa | G06F 1/266 358/1.15 |
| 2016/0036255 A1* | 2/2016 | Aronov | H02J 7/0021 320/126 |
| 2016/0072326 A1* | 3/2016 | Nilles | H02J 7/0071 320/114 |
| 2016/0117274 A1* | 4/2016 | Waters | G06F 13/362 710/106 |
| 2016/0132088 A1* | 5/2016 | Otomo | G06F 1/266 713/310 |
| 2016/0133103 A1* | 5/2016 | Kanomata | G06F 1/266 705/16 |
| 2016/0219484 A1* | 7/2016 | Bontu | H04W 36/0072 |
| 2016/0301226 A1* | 10/2016 | Matsumura | H02J 7/008 |
| 2017/0017283 A1* | 1/2017 | Seo | G06F 1/266 |
| 2017/0085084 A1* | 3/2017 | Daly | H02J 3/00 |
| 2017/0085098 A1* | 3/2017 | Sporck | H02J 7/008 |
| 2017/0220087 A1* | 8/2017 | Hijazi | G06F 1/30 |
| 2017/0293334 A1* | 10/2017 | Pelissier | G06F 1/32 |
| 2018/0032296 A1* | 2/2018 | Tomiyasu | H04N 1/00188 |
| 2018/0109126 A1* | 4/2018 | Gavriliu | H02J 7/0047 |
| 2018/0136708 A1* | 5/2018 | Jahagirdar | G06F 1/3206 |
| 2018/0284866 A1* | 10/2018 | Sakai | G06F 1/325 |
| 2018/0331397 A1* | 11/2018 | Yamaai | H02J 7/34 |
| 2019/0087295 A1* | 3/2019 | Sultenfuss | G06F 1/263 |

* cited by examiner

INFORMATION PROCESSING APPARATUS, METHOD OF CONTROLLING THE SAME, AND NON-TRANSITORY STORAGE MEDIUM STORING PROGRAM EXECUTABLE BY THE INFORMATION PROCESSING APPARATUS

CROSS REFERENCE TO RELATED APPLICATION

The present application claims priority from Japanese Patent Application No. 2017-250785, which was filed on Dec. 27, 2017, the disclosure of which is herein incorporated by reference in its entirety.

BACKGROUND

The following disclosure relates to an information processing apparatus configured to charge a battery with electric power received via a USB (Universal Serial Bus) connector, to a method of controlling the information processing apparatus, and to a non-transitory storage medium storing a program executable by a computer of the information processing apparatus.

There is known an information processing apparatus configured to transmit and receive electric power with external devices according to the USB Power Delivery (USBPD) standard.

SUMMARY

Some information processing apparatuses such as mobile printers and mobile scanners include a battery as a drive source. The information processing apparatus including the battery is capable of changing the battery with electric power received in connection according to the USB PD standard. Meanwhile, when supply of the electric power to the battery is suspended during electric charge, a battery remaining amount thereafter decreases due to, e.g., self-discharge, unfortunately.

Accordingly, an aspect of the disclosure relates to an information processing apparatus including a battery and capable of reducing an amount of reduction in a battery remaining amount due to self-discharge, to a method of controlling the information processing apparatus, and to a non-transitory storage medium storing a program executable by a computer of the information processing apparatus.

In one aspect of the disclosure, an information processing apparatus includes: an interface; a battery; and a controller configured to: determine whether the information processing apparatus receives a reduction notification from an external device via the interface when the interface is receiving the electric power of a first power amount from the external device via the interface, the reduction notification indicating reduction in the electric power from the external device; and request the external device via the interface to supply the electric power of a second power amount when the controller determines that the information processing apparatus receives the reduction notification, the second amount being less than the first power amount, the second power amount being greater than or equal to an amount of the electric power consumed in self-discharge of the battery.

Another aspect of the disclosure relates to a method of controlling an information processing apparatus. The information processing apparatus includes an interface and a battery. The method includes: determining whether the information processing apparatus receives a reduction notification from an external device via the interface when the interface is receiving the electric power of a first power amount from the external device via the interface, the reduction notification indicating reduction in the electric power from the external device; and request the external device via the interface to supply the electric power of a second power amount when it is determined that the information processing apparatus receives the reduction notification, the second amount being less than the first power amount, the second power amount being greater than or equal to an amount of the electric power consumed in self-discharge of the battery.

Yet another aspect of the disclosure relates to a non-transitory storage medium storing a program executable by a computer of an information processing apparatus. The information processing apparatus includes an interface and a battery. When executed by the computer, the program causes the information processing apparatus to: determine whether the information processing apparatus receives a reduction notification from an external device via the interface when the interface is receiving the electric power of a first power amount from the external device via the interface, the reduction notification indicating reduction in the electric power from the external device; and request the external device via the interface to supply the electric power of a second power amount when the information processing apparatus determines that the information processing apparatus receives the reduction notification, the second amount being less than the first power amount, the second power amount being greater than or equal to an amount of the electric power consumed in self-discharge of the battery.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described embodiments by reference to the drawings. First, a mobile printer 1 as one example of an information processing apparatus according to one embodiment will be described with reference to FIG. 1.

Configuration of Mobile Printer

Figure 1:
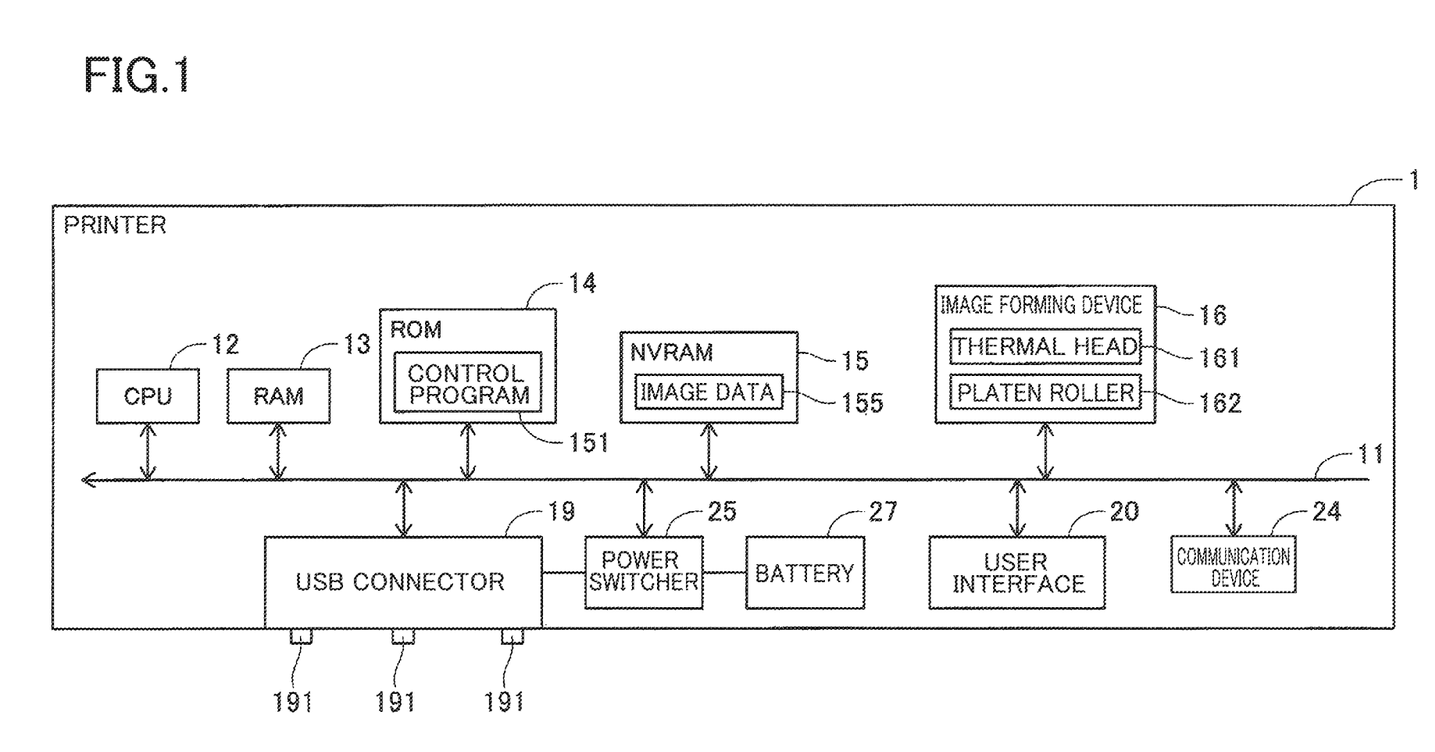
FIG. 1 is a block diagram illustrating an electric configuration of a printer according to a present embodiment.

FIG. 1 illustrates an electric configuration of the mobile printer 1. The printer 1 is a portable mobile printing device configured to print an image on a sheet such as a thermal paper sheet based on image data contained in a print job which is received from, e.g., a personal computer (PC) or a smartphone over wired communication or wireless communication. The printer 1 includes a CPU 12, a RAM 13, a ROM 14, an NVRAM 15, an image forming device 16, a USB (Universal Serial Bus) connector 19 as one example of an interface, a user interface 20, a communication device 24, and a power switcher 25. These devices are connected to each other by a bus 11.

The printer 1 according to the present embodiment includes a battery 27. The battery 27 is a nickel-metal hydride cell, for example. The battery 27 is not limited to the nickel-metal hydride cell and may be a rechargeable battery such as a lithium ion cell. The power switcher 25 is connected to devices of the printer 1 to supply electric power received from the battery 27, to the devices. Thus, the printer 1 is operable by the electric power supplied from the battery 27 as a power source and is portably usable at various places. It is noted that the printer 1 may include a connector, e.g., a DC jack, for connection to an AC adapter. In this case, the power switcher 25 may drive the printer 1 and charge the battery 27 based on the electric power received via the connector.

The ROM 14 is a nonvolatile memory such as a flash memory and stores various programs including a control program 151. For example, the CPU 12 executes the control program 151 read from the ROM 14 to start up a system of the printer 1. The NVRAM 15 stores image data 155. It is noted that the above-described data locations in the storages are one example. For example, the control program 151 may be stored in the NVRAM 15.

The control program 151 is a firmware configured to control devices of the printer 1, for example. The CPU 12 executes the control program 151 to control the devices connected by the bus 11 while temporarily storing a result of executed processings into the RAM 13. The image data 155 is image data contained in a print job which is received from, e.g., the PC or the smartphone over the wired communication or the wireless communication, for example.

The image forming device 16 includes a thermal head 161 as a line head, for example. The CPU 12 controls the image forming device 16 to perform direct thermal printing of an image on a sheet. The image forming device 16 conveys the sheet by rotating a platen roller 162 opposed to the thermal head 161. For example, when the sheet is inserted into an insertion opening of the printer 1 at the start of printing, the inserted sheet is guided to a position between the platen roller 162 and the thermal head 161 and discharged through an output opening after the completion of the printing.

The USB connector 19 is an interface configured to perform communication, transmission, and receipt of the electric power according to the USB PD (USB Power Delivery) standard, for example. The USB connector 19 includes three receptacles 191 each as a connector, for example. The USB connector 19 performs communication, transmission, and receipt of the electric power with at least one external device each connected to a corresponding one of the receptacles 191. Examples of the external devices connectable to the USB connector 19 are various devices connectable to the USB connector 19 according to the USB PD standard, such as a USB memory, a personal computer, an external hard disk, a smartphone, and a card reader.

Each of the receptacles 191 is a connector compliant with the USB Type-C standard, for example. The receptacle 191 includes a plurality of pins for data communication, transmission, and receipt of the electric power, for example. The pins include a D+ pin, a D− pin, and a Vbus pin as connectors in the USB Type-C standard. The receptacle 191 performs data communication using the D+ pin and the D− pin. The receptacle 191 supplies and receives the electric power using the Vbus pin. The Vbus pin is also used for a negotiation for transmission and receipt of the electric power with the external device connected to the receptacle 191. For example, the negotiation for transmission and receipt of the electric power is a processing for setting whether the printer 1 serves as a power source from which the electric power is to be supplied or as a power sink to which the electric power is to be supplied, and for setting an amount of the electric power to be supplied.

The USB connector 19 is connected to the battery 27 via the power switcher 25. For example, the power switcher 25 switches electric power to be supplied to the external device via the Vbus pin of the USB connector 19. The power switcher 25 supplies the electric power received from the external device connected to the USB connector 19, to the devices of the printer 1 and the battery 27. The CPU 12 executes the control program 151 to control the power switcher 25. The CPU 12 controls the power switcher 25 to divide the electric power received from the external device, into the electric power to be supplied to the devices of the printer 1 and the electric power to be supplied to the battery 27. It is noted that the CPU 12 and the power switcher 25 may be configured as one processing circuit instead of different processing circuits. The negotiation of transmission and receipt of the electric power may be executed by the CPU 12 or by the power switcher 25.

The user interface 20 is a touch screen, for example. The user interface 20 includes: a liquid crystal panel; a light source, such as a LED, configured to emit light from one of opposite sides of the liquid crystal panel which one is nearer to a back surface of the liquid crystal panel; and a touch sensing layer stuck to a front surface of the liquid crystal panel. The CPU 12 controls the user interface 20 to change images to be displayed on the liquid crystal panel to display various kinds of information on the printer 1. The user interface 20 outputs, to the CPU 12, a signal related to an input operation performed on the touch screen.

The communication device 24 is capable of performing wired communication and wireless communication (e.g., infrared communication). To cause the printer 1 to perform printing, for example, the user transmits a print job from a smartphone to the printer 1 over wireless communication. The print job includes image data, various settings for printing, and other print information. The CPU 12 controls the communication device 24 to receive the print job (e.g., the image data 155) over the wireless communication. The CPU 12 controls the image forming device 16 to perform printing based on the received print job.

Charging Control

Figure 2:
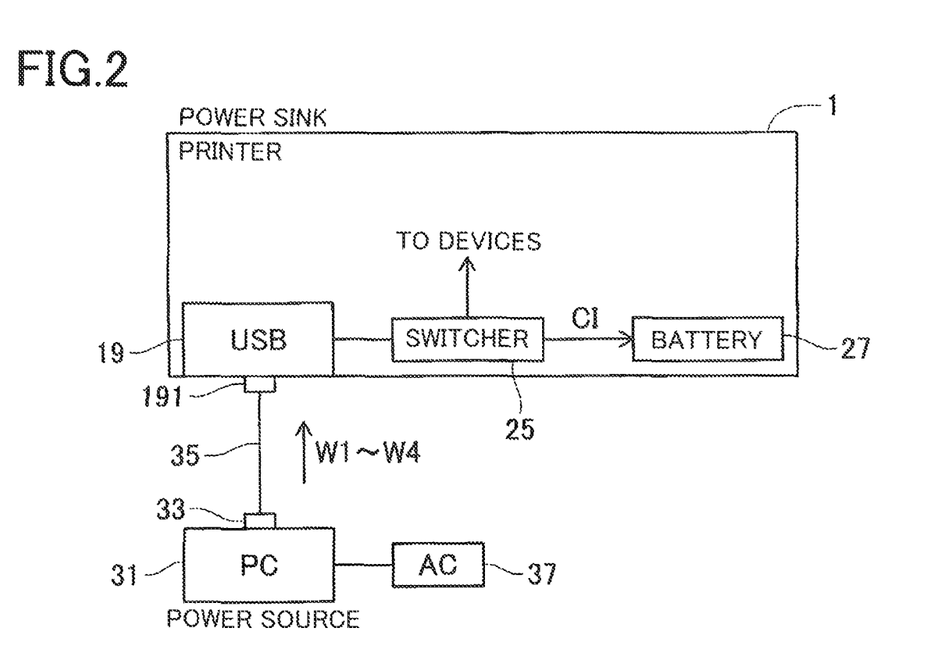
FIG. 2 is a view illustrating a configuration of connection between the printer and an external device.

There will be next described charging control for the battery 27 in the printer 1 according to the present embodiment. The printer 1 according to the present embodiment receives the electric power from the external device via the USB connector 19 and charges the battery 27 with the received electric power. FIG. 2 illustrates one example of connection between the external device and the printer 1 configured to execute the charging control for the battery 27. As illustrated in FIG. 2, a PC 31 as the external device is connected to the USB connector 19 of the printer 1. The PC 31 includes a USB connector 33 configured to perform communication according to the USB PD standard. The USB connector 33 is connected to one of the three receptacles 191 via a USB cable 35. The PC 31 is connected to a commercial power source 37 and receives electric power from the commercial power source 37. In the following description, the CPU 12 that executes the control program 151 may be hereinafter referred to simply as "the CPU 12". For example, the wordings "the CPU 12 determines" may mean "the CPU 12 that executes the control program 151 determines".

When the power source of the printer 1 is turned on or when the PC 31 is connected to one of the receptacles 191, the CPU 12 executes the control program 151 stored in the ROM 14 to perform a negotiation with the PC 31 for transmission and receipt of the electric power. To charge the battery 27, the CPU 12 makes a request to the PC 31 for setting of the power sink. When the negotiation has succeeded, the PC 31 is set as a power source, and the printer 1 is set as a power sink (see FIG. 2).

The PC 31 as the power source connected to the printer 1 according to the USB PD standard supplies electric power to the printer 1. This electric power is obtained by combining a voltage value and a current value from among a plurality of voltage values and a plurality of current values. In the present embodiment, for example, the CPU 12 requests the PC 31 to transmit the electric power of one of a first power amount W1, a second power amount W2, a third power amount W3, and a fourth power amount W4 illustrated in FIG. 2. The first power amount W1 is 15 W electric power, with a voltage value being 5 V, and a current value being 3 A, for example. By receiving the electric power of the first power amount W1, it is possible to secure enough electric power to perform normal charge or quick charge of the battery 27. The quick charge is an electric charge in which the speed of the electric charge is increased by supplying, to the battery 27, a charging current CI (see FIG. 2) that is higher than a current value in the normal charge, for example.

Figure 3:
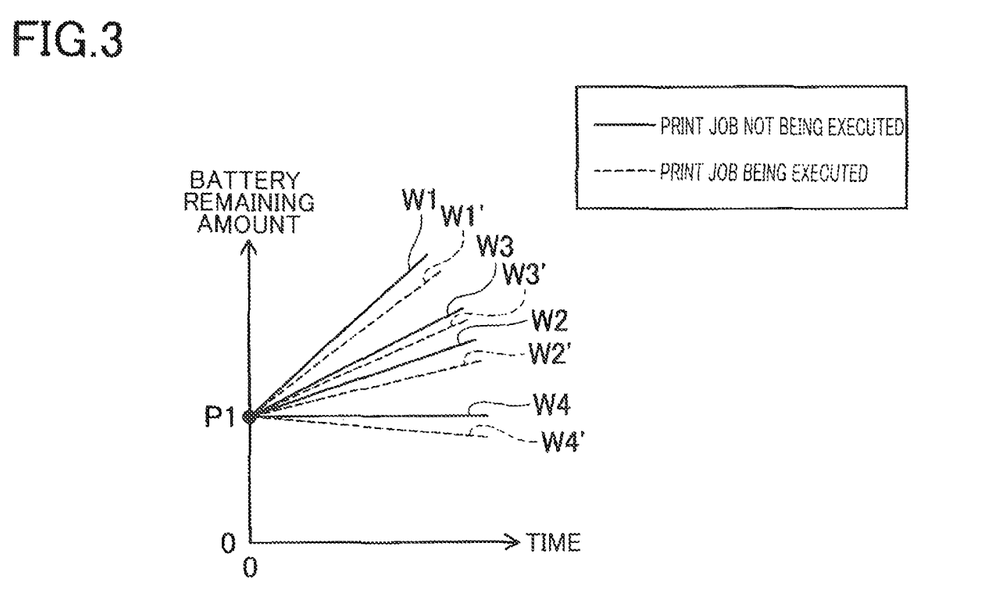
FIG. 3 is graphs each representing a relationship between a battery remaining amount and a time for a corresponding one of amounts of electric power in each of the case where a print job is being executed and where the print job is not being executed.

FIG. 3 represents a relationship between a battery remaining amount and a time in the case where the battery 27 is charged with the electric power of each of the first to fourth power amounts W1-W4 which is received from the PC 31. P1 in FIG. 3 indicates an initial value of the battery remaining amount at the start of the electric charge. As described above, the CPU 12 may perform the normal charge or the quick charge in the case where the electric power of the first power amount W1 is received by the USB connector 19. Thus, in the state in which the USB connector 19 is receiving the electric power of the first power amount W1, the battery remaining amount increases from the initial value P1 at a predetermined rate with the passage of time.

In the graphs in FIG. 3, each of the first to fourth power amounts W1-W4 indicated by the respective solid lines indicates a battery remaining amount in a print-job non-executing state in which the print job is not being executed. In FIG. 3, each of first to fourth power amounts W1'-W4' indicated by the respective broken lines indicates a battery remaining amount in a print-job executing state in which new power consumption is generated due to the start of a print job (that is, the print job is being executed) when the USB connector 19 is receiving the electric power of a corresponding one of the first to fourth power amounts W1-W4 from the PC 31. When the CPU 12 executes the print job, the electric power is supplied to, e.g., the image forming device 16, leading to a possibility of a necessity for reducing the charging current CI (see FIG. 2) used for electric charge. In the case where the charging current CI is reduced, as illustrated in FIG. 3, the amount of increase in the battery remaining amount is less in the case of the first power amount W1' in the print-job executing state than in the case of the first power amount W1 in the print-job non-executing state.

The third power amount W3 is 10 W electric power, with a voltage value being 5 V, and a current value being 2 A, for example. The CPU 12 may perform low-speed charge of the battery 27 in the state in which the USB connector 19 is receiving the electric power of the third power amount W3. The low-speed charge is an electric charge in which the speed of the electric charge is reduced by supplying, to the battery 27, the charging current CI that is lower than the current value in the normal charge, for example. Thus, as illustrated in FIG. 3, the amount of increase in the battery remaining amount is less in the graph in the case of the third power amount W3 than in the graph in the case of the first power amount W1. Like the above-described first power amount W1', the amount of increase in the battery remaining amount may be less in the case of the third power amount W3' in the print-job executing state than in the case of the third power amount W3' in the print-job non-executing state.

The fourth power amount W4 is 2.5 W electric power, with a voltage value being 5 V, and a current value being 0.5 A, for example. The fourth power amount W4 is a default amount of the electric power that is defined according to USB 2.0 and that can produce the charging current CI required for trickle charge. The trickle charge is electric charge of the battery 27 only with electric power of an amount corresponding to that of the electric power consumed in self-discharge of the battery 27. Here, it is possible to consider that the wordings "the CPU 12 requests the PC 31 to supply the electric power of the fourth power amount W4" means "the CPU 12 requests the PC 31 to change an amount of the electric power being supplied from the PC 31, to the default amount of the electric power". The CPU 12 may perform the trickle charge of the battery 27 in the state in which the USB connector 19 is receiving the electric power of the fourth power amount W4. In the case where the trickle charge is executed by receiving the fourth power amount W4, as illustrated in FIG. 3, the battery remaining amount is kept at the initial value P1 that is a value at the start of the electric charge. In the case where the CPU 12 starts executing the print job during execution of the trickle charge, there is a possibility of difficulty in securing the electric power required for the trickle charge. This leads to a possibility that the battery remaining amount in the case of the fourth power amount W4' in the print-job executing state decreases with the passage of time.

The second power amount W2 is 5 W electric power, with a voltage value being 5 V, and a current value being 1 A, for example. The second power amount W2 is an amount of the electric power which is greater than or equal to the amount of the electric power consumed in the self-discharge of the battery 27. That is, the second power amount W2 is greater than or equal to the fourth power amount W4. In the state in which the USB connector 19 is receiving the electric power of the second power amount W2, the CPU 12 controls the power switcher 25 to supply the charging current CI to the battery 27 to charge the battery 27, and the current value of this charging current CI is less than the current value for the low-speed charge and greater than the current value for the trickle charge, for example. Thus, in the state in which the USB connector 19 is receiving the electric power of the second power amount W2, as illustrated in FIG. 3, the amount of increase in the battery remaining amount is less than that in the case of the third power amount W3 and greater than that in the case of the fourth power amount W4. Like the above-described first power amount W1', the amount of increase in the battery remaining amount may be less in the case of the second power amount W2' in the print-job executing state than in the case of the second power amount W2' in the print-job non-executing state.

In the present embodiment, as described above, the first power amount W1 is the largest among the first to fourth power amounts W1-W4, followed by the third power amount W3, the second power amount W2, and the fourth power amount W4 in this order. It is noted that each of the voltage values, the current values, and the amounts of the electric power described above is one example. Each of the forms and the values of the graphs illustrated in FIG. 3 is one example.

Figure 4:
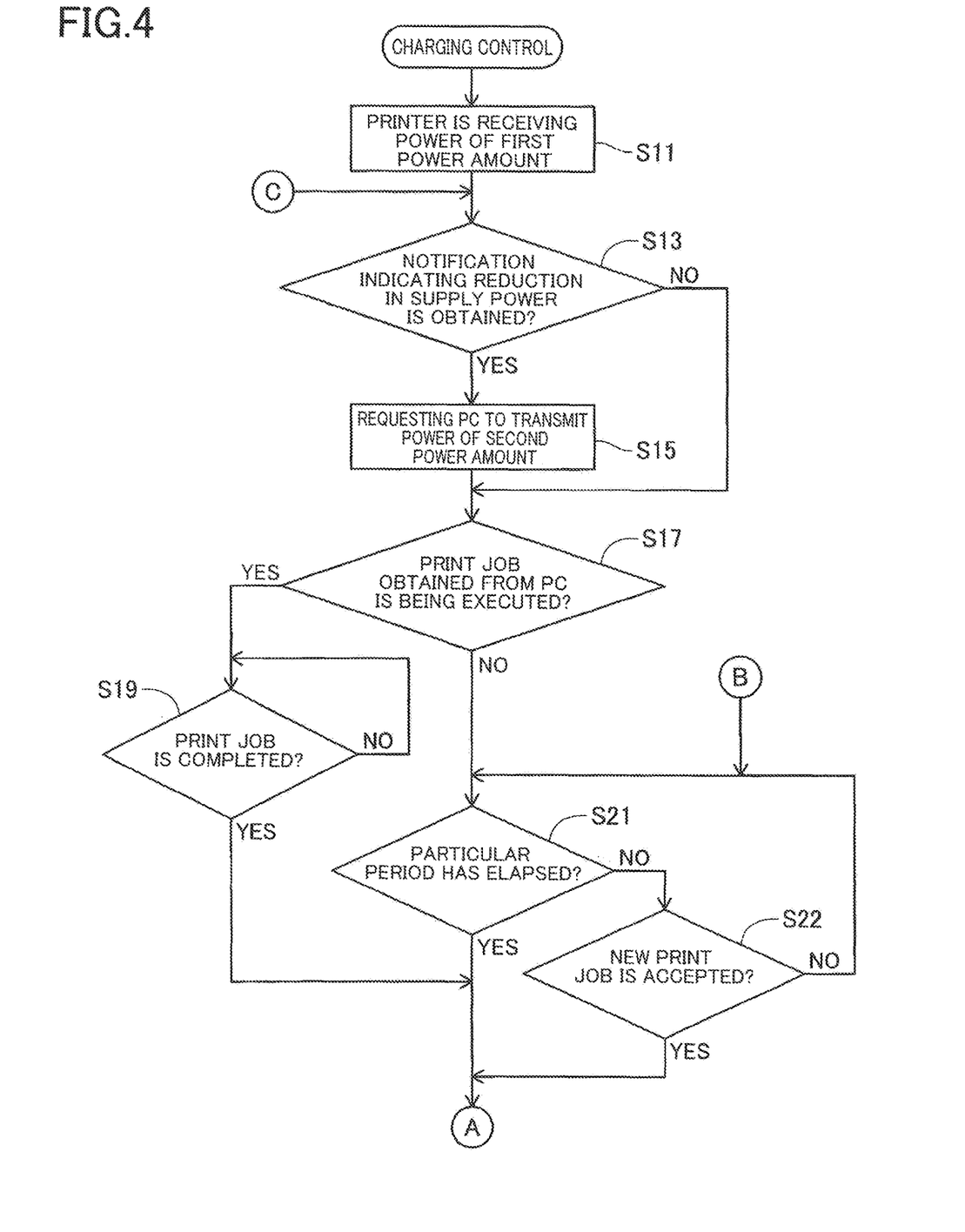
FIG. 4 is a flowchart representing a portion of charging control.
Figure 5:
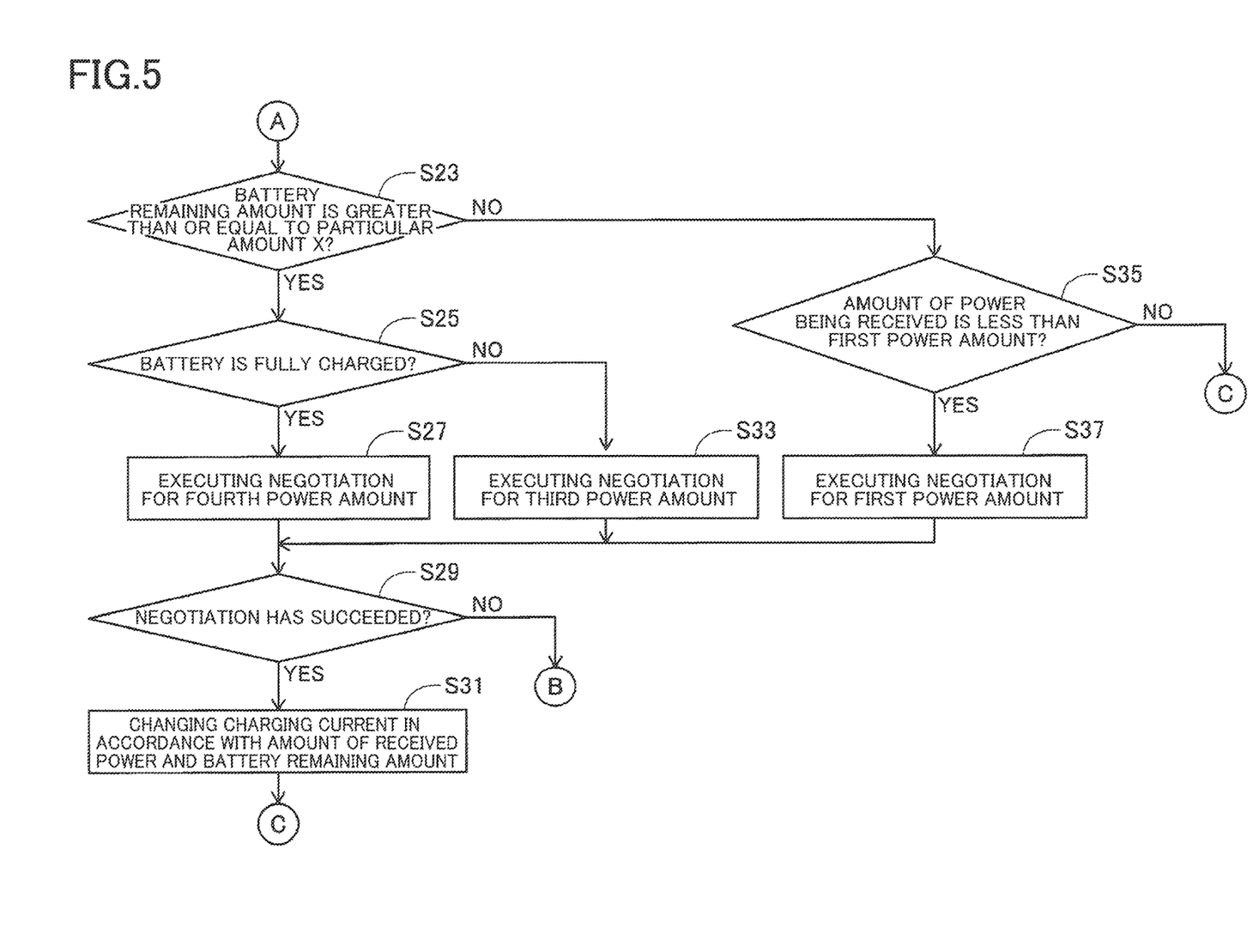
FIG. 5 is a flowchart representing the other portion of the charging control.

There will be next described the details of the charging control with reference to FIGS. 4 and 5. FIGS. 4 and 5 illustrate a process of the charging control. When the electric power of the first power amount W1 is received from the PC 31, the CPU 12 starts the charging control illustrated in FIGS. 4 and 5, for example.

The flow of the charging control begins with S11 in FIG. 4 at which the printer 1 is receiving the electric power of the first power amount W1. The CPU 12 requests the PC 31 to transmit the electric power of the first power amount W1 to the printer 1, in the case where the PC 31 is connected to one of the receptacles 191 when the power source of the printer 1 is turned on or in the case where the PC 31 is newly connected to one of the receptacles 191 after the start-up of the printer 1, for example. Alternatively, when the battery remaining amount of the battery 27 is less than or equal to a particular value, the CPU 12 requests the PC 31 to transmit the electric power of the first power amount W1 to the printer 1.

The CPU 12 at S13 determines whether a reduction notification indicating reduction in the electric power to be supplied from the PC 31 is obtained. In the case where processing load has increased in the PC 31 during supply of the electric power to the printer 1, for example, power consumption in the PC 31 increases, which may lead to power shortage. In this case, the PC 31 communicates with the printer 1 via the USB connector 19 to notify the printer 1 about reduction in the electric power. It is noted that the reduction in the electric power in this description is a concept including both of reduction in amount of the electric power and a complete stop of supply of the electric power. The word "obtain" is a concept which does not necessarily require a request. That is, processing executed by the CPU 12 for receiving data without a request is included in a concept that the CPU 12 obtains data. The reduction notification includes any of the followings: a notification indicating, as power to be supplied, an amount of electric power which is less than the first power amount W1 of the electric power being supplied from the PC 31; a notification indicating, as suppliable power, an amount of electric power which is less than the first power amount W1 of the electric power being supplied from the PC 31; and a notification indicating reduction of an amount ΔW from the first power amount W1 of the electric power being supplied from the PC 31.

When the CPU 12 at S13 determines that the reduction notification is not obtained from the PC 31 (S13: NO), this flow goes to S17. When the CPU 12 determines that the reduction notification is obtained from the PC 31 (S13: YES), the CPU 12 at S15 requests the PC 31 via the USB connector 19 to transmit the electric power of the second power amount W2 to the printer 1. The CPU 12 increases the second power amount W2 requested in the case where the print job is being executed, when compared with the second power amount W2 requested in the case where the print job is not being executed, or in the case where execution of the print job is not planned, for example. In the case where the electric power is consumed by an operation different from electric charge of the battery 27, such as execution of the print job, the CPU 12 requests the PC 31 to transmit the electric power of an amount, as the second power amount W2, which is greater than or equal to an amount obtained by adding a power consumption amount required for, e.g., execution of the print job to an amount of the electric power which is required for the electric charge, for example. With this operation, the CPU 12 secures the electric power required for the electric charge and the electric power required for execution of the print job in the case where the reduction notification is obtained from the PC 31. It is noted that the CPU 12 continues processings at S17 and subsequent steps which will be described below, regardless of whether a negotiation for requesting the second power amount W2 at S15 has succeeded. Alternatively, the CPU 12 may not start the processings at S17 and subsequent steps until the negotiation for requesting the second power amount W2 at S15 has succeeded. At least during receiving image data relating to the print job from the PC 31, the CPU 12 may set, as the second power amount W2, an amount of the electric power which is greater than or equal to an amount obtained by adding the power consumption amount required for execution of the print job to the amount of the electric power consumed in the self-discharge of the battery 27, for example.

As described above, the second power amount W2 is greater than or equal to the amount of the electric power consumed in the self-discharge of the battery 27, that is, the second power amount W2 is greater than or equal to the fourth power amount W4. This configuration enables the CPU 12 to secure electric power required for at least the trickle charge by securing the electric power of the second power amount W2. By securing the electric power required for at least the trickle charge, the CPU 12 can reduce an amount of reduction in the battery remaining amount. As indicated by the graph for the fourth power amount W4' in FIG. 3, the battery remaining amount decreases in the case where the fourth power amount W4 required for the trickle charge cannot be secured. In the case where the nickel-metal hydride cell is used for the battery 27, for example, when the battery 27 is charged after the battery remaining amount is reduced by self-discharge and before the battery 27 is fully discharged, the voltage may lower due to occurrence of a memory effect. To solve this problem, in the case where the reduction notification is obtained from the PC 31, the CPU 12 in the present embodiment secures the electric power required for at least the trickle charge to reduce an amount of reduction in the battery remaining amount due to the self-discharge of the battery 27, resulting in reduction in occurrences of the memory effect in the battery 27.

Upon completion of the processing at S15, the CPU 12 at S17 determines whether the print job obtained from the PC 31 is being executed. When the print job obtained from the PC 31 is being executed (S17: YES), this flow goes to S19. The CPU 12 at S19 determines whether execution of the print job obtained from the PC 31 is completed.

When execution of the print job obtained from the PC 31 is not completed (S19: NO), the CPU 12 repeats the processing at S19. When execution of the print job obtained from the PC 31 is completed (S19: YES), this flow goes to S23 in FIG. 5. Here, when the PC 31 requests the printer 1 to execute the print job, there is a possibility of temporal power shortage in the PC 31 due to execution of a processing relating to the print job (e.g., a processing for converting print data), for example. In other words, after the completion of the print job transmitted from the PC 31, there is a high possibility that the power shortage in the PC 31 is eliminated. Thus, the CPU 12 in the present embodiment executes a processing at S23 which will be described below (as one example of a battery-remaining-amount determination processing) after the completion of execution of the print job obtained from the PC 31. This operation enables the CPU 12 to negotiate for the first power amount W1 with the PC 31 after the power shortage therein is eliminated, resulting in improved possibility of success of the negotiation. The negotiation for requesting the first power amount W1 is executed at S23 and subsequent steps (specifically at S37 FIG. 5).

When the CPU 12 at S17 determines that the print job obtained from the PC 31 is not being executed (S17: NO), the CPU 12 at S21 determines whether a particular period has elapsed. This particular period is a length of time elapsed after the processing at S13 is executed, for example. Specifically, the particular period is a length of time extending from the time when a power shortage occurs in the PC 31, to the time when the power shortage is eliminated. As described above, when the power shortage has occurred, the PC 31 may notify the printer 1 about reduction in the electric power to be supplied (S13), for example. When the particular period has elapsed, there is a possibility that the power shortage in the PC 31 is eliminated by various changes in situation. Thus, the CPU 12 waits for the particular period until the situation of the PC 31 is changed. Accordingly, as the particular period used at S21, it is possible to use each of an average time and a maximum time of times required for an external device serving as a power source (e.g., the PC 31) to eliminate power shortage in various events of possible power shortages, for example. In the case where a power source which supplies the electric power to the printer 1 is another printer, for example, there is a possibility of temporal power shortage in the printer serving as the power source with the start of the print processing. Thus, in the case where the power source is the printer, a length of time required for the printer serving as the power source to complete the print processing may be set as the particular period at S21. By waiting at S21 for the particular period required for the external device as the power source eliminates the power shortage, the CPU 12 increases a possibility of success of the negotiation in S23 and subsequent steps in FIG. 5 which will be described below.

When the CPU 12 at S21 determines that the particular period has not elapsed from the completion of execution of the processing at S13 (S21: NO), the CPU 12 at S22 determines whether a new print job is accepted. The new print job is a print job newly obtained from the PC 31 or from, e.g., a smartphone via the communication device 24 (see FIG. 1), for example. When the CPU 12 determines that the new print job is not accepted (S22: NO), the CPU 12 repeats the processing at S21. When the CPU 12 determines that the new print job is accepted (S22: YES), this flow goes to S23 in FIG. 5. When the new print job is accepted and executed, there is a possibility of new consumption of the electric power due to execution of the print job. Thus, the CPU 12 in the present embodiment starts the processings at S23 and subsequent steps as quickly as possible before consumption of the electric power occurs due to execution of the new print job, making it possible for the CPU 12 to start the negotiation with the PC 31 before occurrence of the power shortage.

At S23 in FIG. 5, the CPU 12 determines whether or not the battery remaining amount of the battery 27 is greater than or equal to a particular amount X. When the CPU 12 determines that the battery remaining amount is greater than or equal to the particular amount X (S23: YES), the CPU 12 executes the processings at S25 and subsequent steps. In the processings at S25 and subsequent steps, the CPU 12 executes the trickle charge with the fourth power amount W4 at S27 and the low-speed charge with the third power amount W3 at S33 as will be described below. When the CPU 12 determines that the battery remaining amount is less than the particular amount X (S23: NO), the CPU 12 executes the normal charge or the quick charge with the first power amount W1 as will be described below. Thus, the particular amount X used at S23 is a threshold value for determining whether a state of the battery 27 is a state in which the battery 27 has such a large battery remaining amount that the trickle charge or the low-speed charge is enough, or a state in which the battery 27 has such a small battery remaining amount that the normal charge or the quick charge is required. The particular amount X is 80% of the full capacity of the battery 27, for example. In this case, when the battery remaining amount is greater than or equal to 80%, the CPU 12 executes the trickle charge or the low-speed charge. When the battery remaining amount is less than 80%, the CPU 12 executes the normal charge or the quick charge. It is noted that the particular amount X may be determined in accordance with the full capacity of the battery 27 and the amount of increase in the battery remaining amount in each of the low-speed charge, the normal charge, and the quick charge, for example.

The CPU 12 at S23 detects the battery remaining amount based on the battery voltage of the battery 27, for example. The ROM 14 stores data in which values of the battery voltage and values of the battery remaining amount are associated with each other. The CPU 12 detects the battery voltage of the battery 27 to search for a value of the battery remaining amount corresponding to the value of the detected battery voltage, from the data stored in the ROM 14. The CPU 12 determines the searched value as the battery remaining amount. When the CPU 12 determines that the battery remaining amount is greater than or equal to the particular amount X (S23: YES), the CPU 12 at S25 determines whether the battery remaining amount is the maximum amount (100%), that is, the CPU 12 at S25 determines whether the battery 27 is fully charged. When the CPU 12 determines that the battery 27 is fully charged (S25: YES), the CPU 12 at S27 executes a negotiation with the PC 31 for transmission of the electric power of the fourth power amount W4. When the negotiation for transmission of the electric power of the fourth power amount W4 is started (S27), the CPU 12 at S29 determines whether the started negotiation has succeeded. The CPU 12 determines whether the negotiation has succeeded, based on a response transmitted from the PC 31 with respect to the request at S27, for example.

When the negotiation has failed (S29: NO), the CPU 12 executes the processings at S21 in FIG. 4 and subsequent steps again. By starting the processing (S23) for waiting for the particular period again, the CPU 12 can execute a negotiation again with the PC 31 in which a state of consumption of the electric power has changed.

When the negotiation at S27 has succeeded (S29: YES), the CPU 12 at S31 changes the charging current CI in accordance with an amount of the electric power received from the PC 31 and the battery remaining amount. In the case where the CPU 12 executes the processing at S27, the battery remaining amount is the maximum amount. Thus, the CPU 12 executes the processings at S27 and S29, and when the electric power of the fourth power amount W4 is received from the PC 31, the CPU 12 executes the trickle charge (S31). The CPU 12 produces the charging current CI required for the trickle charge from the electric power of the fourth power amount W4 and supplies the produced charging current CI to the battery 27. The trickle charge is performed for the battery 27. Upon completion of the processing at S31, the CPU 12 executes the processings at S13 in FIG. 4 and subsequent steps again.

In the case where the nickel-metal hydride cell is used for the battery 27, a memory effect occurs when the battery 27 is charged after the battery remaining amount is reduced by self-discharge and before the battery 27 is fully discharged. To prevent reduction in the battery remaining amount due to the self-discharge, in the present embodiment, the CPU 12 executes the trickle charge to keep the battery 27 fully charged. Lithium ion cells may deteriorate if the lithium ion cell is kept fully charged, or an overcurrent is applied to the lithium ion cell in its fully charged condition. Hence, in the case where the battery 27 is a lithium ion cell, the CPU 12 may keep the fully-charged condition of the battery 27 by the trickle charge to reduce occurrences of overcurrent, for example. Alternatively, in the case where the battery 27 is a lithium ion cell, the CPU 12 may charge the battery 27 such that the battery 27 keeps a battery remaining amount less than the maximum amount to prevent the battery 27 from being kept fully charged. These configurations prevent deterioration of the battery 27. Furthermore, in the case where the battery 27 is fully charged, the CPU 12 requests the PC 31 to transmit the electric power of the fourth power amount W4 that is the smallest among the requestable power amounts. This operation enables the PC 31 to secure the electric power at reduced load.

When the CPU 12 determines at S25 that the battery 27 is not fully charged (S25: NO), the CPU 12 at S33 executes a negotiation with the PC 31 for transmission of the electric power of the third power amount W3. When the negotiation for transmission of the electric power of the third power amount W3 is started at S33, the CPU 12 at S29 determines whether the started negotiation has succeeded. When the negotiation has succeeded (S29: YES), the CPU 12 at S31 changes the charging current CI. In the case where the CPU 12 executes the processing at S33, the battery remaining amount is greater than or equal to the particular amount X (e.g., 80%) and less than the maximum amount (100%). In this case, the CPU 12 executes the processings at S33 and S29, and when the electric power of the third power amount W3 is received from the PC 31, the CPU 12 executes the low-speed charge (S31). As described above, lithium ion cells may deteriorate if the lithium ion cell is kept fully charged. To solve this problem, in the present embodiment, when the battery remaining amount is greater than or equal to 80%, the CPU 12 executes the low-speed charge to reduce the speed of the electric charge in order to avoid the full-charge condition of the battery 27. This operation avoids the battery 27 from being kept fully charged, making it possible to reduce deterioration of the battery 27.

When the CPU 12 at S23 determines that the battery remaining amount is less than the particular amount X (S23: NO), the CPU 12 at S35 determines whether an amount of the electric power being received from the PC 31 is less than the first power amount W1. When the amount of the electric power being received from the PC 31 is not less than the first power amount W1, that is, when the electric power of the first power amount W1 is being received from the PC 31 (S35: NO), the CPU 12 executes the processings at S13 in FIG. 4 and subsequent steps again. In this case, the CPU 12 charges the battery 27 using the normal charge and the quick charge with the electric power of the first power amount W1 received from the PC 31.

When the CPU 12 at S35 determines that the amount of the electric power being received from the PC 31 is less than the first power amount W1 (S35: YES), the CPU 12 at S37 executes the negotiation with the PC 31 for transmission of the first power amount W1. It is noted that the state in which the electric power of an amount less than the first power amount W1 is being received includes: a state in which the electric power of any of the second power amount W2, the third power amount W3, and the fourth power amount W4 is being received; and a state in which no electric power is supplied from the PC 31. Accordingly, the CPU 12 executes the processing at S37 in the case where supply of the electric power from the PC 31 is stopped at execution of the processing at S35.

When the battery remaining amount becomes less than the particular amount X, the normal charge or the quick charge of the battery 27 is required. When the CPU 12 determines that the battery remaining amount is less than the particular amount X (S23: NO), the CPU 12 requests the PC 31 to transmit the first power amount W1 to the printer 1. When the negotiation for requesting the first power amount W1 is started (S37), the CPU 12 at S29 determines whether the started negotiation has succeeded. When the negotiation has succeeded (S29: YES), the CPU 12 at S31 changes the charging current CI. The CPU 12 executes the processings at S37 and S29, and when the electric power of the first power amount W1 is received from the PC 31, the CPU 12 executes the normal charge or the quick charge (S31). Upon the completion of the processing at S31, the CPU 12 executes the processings at S13 in FIG. 4 and subsequent steps again. The CPU 12 executes the charging control for the battery 27 in the manner described above. It is noted that the CPU 12 may execute only one of the normal charge and the quick charge in the state in which the electric power of the first power amount W1 is being received. Alternatively, the CPU 12 may execute the normal charge and the quick charge depending upon a situation, for example, the CPU 12 may execute the quick charge when the battery remaining amount is less than 60%, and execute the normal charge when the battery remaining amount is greater than or equal to 60%.

The printer 1 is one example of the information processing apparatus. The CPU 12 is one example of a controller. The image forming device 16 is one example of an image processor. The PC 31 is one example of an external device. The thermal head 161 is one example of a printing device.

Effects

The embodiment described above achieves the following effects. The printer 1 according to the present embodiment includes: the USB connector 19 configured to receive the electric power from the PC 31 in connection according to the USB PD standard; the battery 27 configured to be charged with the electric power received via the USB connector 19; and the CPU 12. The CPU 12 is configured to: execute the receiving determination processing (S13) for determining whether the reduction notification indicating reduction in the electric power is received from the PC 31 in the state in which the electric power of the first power amount W1 is receiving from the PC 31; and when the CPU 12 determines in the receiving determination processing (S13) that the reduction notification is obtained (S13: YES), execute the first request processing (S15) for requesting the PC 31 to transmit the electric power of the second power amount W2 that is an amount of the electric power less than the first power amount W1 and greater than or equal to the amount of the electric power consumed in the self-discharge of the battery 27.

With this configuration, when the reduction notification is received from the PC 31, the CPU 12 requests the PC 31 to transmit the electric power of the second power amount W2 to the printer 1. This second power amount W2 is an amount less than the first power amount W1 of the electric power being received and greater than or equal to the amount of the electric power consumed in the self-discharge of the battery 27. Thus, the CPU 12 reduces the electric power received from the PC 31 in response to the request and secures the electric power of the second power amount W2 greater than or equal to the amount of the electric power consumed in the self-discharge of the battery 27. The CPU 12 reduces an amount of reduction in the battery remaining amount due to the self-discharge by charging the battery 27 with the electric power of the second power amount W2.

The printer 1 includes the image forming device 16 configured to execute the print job relating to the image processing. When the image forming device 16 is executing the print job, the CPU 12 in the first request processing (S15) sets, as the second power amount W2, an amount greater than or equal to an amount of the electric power which is obtained by adding the power consumption amount required for execution of the print job to the amount of the electric power consumed in the self-discharge of the battery 27.

With this configuration, in the case where the image forming device 16 is executing the print job, the CPU 12 requests the PC 31 to transmit the electric power of the second power amount W2 in which the power consumption amount required for execution of the print job is added. This makes it possible to secure not only the electric power compensating for the electric power required for the self-discharge of the battery 27 but also the electric power required for execution of the print job.

The image forming device 16 includes the thermal head 161 configured to print an image on a sheet. In the present embodiment, the job relating to the image processing is the print job for causing the thermal head 161 to print an image on the sheet based on the image data transmitted from the PC 31. At least when the image data relating to the print job is being received from the PC 31, the CPU 12 may execute the processing in the first request processing (S15) for setting, as the second power amount W2, the amount greater than or equal to the amount of the electric power which is obtained by adding the power consumption amount required for execution of the job to the amount of the electric power consumed in the self-discharge of the battery.

This configuration enables the CPU 12 to continue securing the electric power required for execution of the print job, during receiving of the image data for the print job from the PC 31.

The CPU 12 receives the image data relating to the print job from the PC 31 via the USB connector 19.

This configuration enables the CPU 12 to secure the electric power required for execution of the print job received from the PC 31 connected to the USB connector 19.

The CPU 12 is configured to execute: after execution of the first request processing (S15), the battery-remaining-amount determination processing (S23) for determining whether the battery remaining amount as the remaining amount of the battery 27 is greater than or equal to the particular amount X; when the CPU 12 determines in the battery-remaining-amount determination processing (S23) that the battery remaining amount is greater than or equal to the particular amount X (S23: YES), a second request processing (S33) for requesting the PC 31 to transmit the electric power of the third power amount W3 that is less than the first power amount W1 and greater than the second power amount W2; and when the CPU 12 determines in the battery-remaining-amount determination processing (S23) that the battery remaining amount is less than the particular amount X (S23: NO), a third request processing (S37) for requesting the PC 31 to transmit the electric power of the first power amount W1.

With this configuration, when the battery remaining amount is greater than or equal to the particular amount X, the CPU 12 requests the PC 31 to transmit the electric power of the third power amount W3 that is less than the first power amount W1. Thus, in the case where the battery remaining amount is large, the CPU 12 requests the PC 31 to transmit a smaller amount of the electric power, enabling the PC 31 to secure the electric power at reduced load. In the case where the battery remaining amount is less than the particular amount X, the CPU 12 requests the PC 31 to transmit the electric power of the first power amount W1. This operation enables the CPU 12 to secure the electric power required for the electric charge to quickly charge the battery 27.

The CPU 12 executes a job-execution determination processing (S17) for determining whether the print job received from the PC 31 is being executed by the image forming device 16. When the CPU 12 determines in the job-execution determination processing that the print job received from the PC 31 is being executed by the image forming device 16 (S17: YES), the CPU 12 executes a job-completion determination processing (S19) for determining whether execution of the print job is completed. When the CPU 12 determines in the job-completion determination processing that the execution of the print job is completed (S19: YES), the CPU 12 executes the battery-remaining-amount determination processing (S23).

In the case where the PC 31 instructs the printer 1 to execute the print job, when a processing relating to the print job (e.g., a processing for converting print data) is executed by the PC 31, the PC 31 may become short of the electric power and transmit the reduction notification to the printer 1. In other words, when execution of the print job is completed, there is a possibility that the power shortage in the PC 31 is eliminated. Hence, in the case where the print job received from the PC 31 is being executed, the CPU 12 executes the processings at S23 and subsequent steps after completing the execution of the print job. This configuration enables the CPU 12 to execute the processings (S27, S33, S37) for requesting the electric power in accordance with the battery remaining amount, to the PC 31 in which the power shortage is eliminated.

The CPU 12 executes an elapsed-time determination processing (S21) for determining whether the particular period has elapsed after execution of the receiving determination processing (S13). The CPU 12 executes a new-job determination processing (S22) for determining whether a new print job is received. The CPU 12 executes the battery-remaining-amount determination processing (S23) when the CPU 12 determines in the elapsed-time determination processing that the particular period has not elapsed (S21: NO), and the CPU 12 determines in the new-job determination processing that the new print job is received (S22: YES).

This configuration enables the CPU 12 to wait for the particular period after execution of the processing at S13 to temporarily suspend the processing until the state of the PC 31 changes. When a new job is received by the printer 1 during waiting of the CPU 12, the CPU 12 starts the processings at S23 and subsequent steps. This configuration enables the CPU 12 to start the processings (S27, S33, S37) for requesting the electric power in accordance with the battery remaining amount, before electric power is newly consumed in the printer 1 due to execution of the new job.

After executing the first request processing (S15), the CPU 12 executes a full-charge determination processing (S25) for determining whether the battery 27 is fully charged. When the CPU 12 determines in the full-charge determination processing that the battery 27 is fully charged (S25: YES), the CPU 12 executes a fourth request processing (S27) for requesting the PC 31 to transmit the electric power of the fourth power amount W4 that is an amount of the electric power which is less than or equal to the second power amount W2 and which corresponds to an amount of the electric power for the trickle charge of the battery 27.

With this configuration, in the case where the battery 27 is fully charged, the CPU 12 requests the PC 31 to transmit the electric power of the fourth power amount W4 that is less than or equal to the second power amount W2 and corresponds to the amount of the electric power required for the trickle charge. Thus, in the case where the battery 27 is fully charged, the CPU 12 requests the PC 31 to transmit a smaller amount of the electric power, enabling the PC 31 to secure the electric power at reduced load.

Modifications

While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, the external device is not limited to the PC 31 and may be any of devices capable of supplying the electric power, such as a printer, an external hard disk, and a smartphone. The USB standard is not limited to the USB PD standard and may be other standards according to which the electric power to be supplied is changeable by a negotiation.

In the case where the print job is being executed, the CPU 12 may not add the power consumption amount required for execution of the print job, to the second power amount W2. The CPU 12 may not change the amount of the electric power requested to the PC 31 in accordance with the battery remaining amount. In this case, the CPU 12 may execute only the processings at S11, S13, and S15 as the charging control. The CPU 12 may not execute the processing at S19 for waiting for the completion of the print job. The CPU 12 may execute the processing at S23 after S17 without executing the processing at S21 for waiting for the particular period.

The CPU 12 may determine whether the battery remaining amount is greater than or equal to the particular amount X (S23), without determining, as in the processing at S17, whether the print job obtained from the PC 31 is being executed, as long as the CPU 12 executes the determination at S23 after the CPU 12 at S15 requests the PC 31 to transmit the electric power of the second power amount and after execution of the print job received from the PC 31 is completed (S19: YES). The CPU 12 may determine whether the battery remaining amount is greater than or equal to the particular amount X (S23), without determining, as in the processing at S17, whether the print job obtained from the PC 31 is being executed, as long as the CPU 12 executes the determination at S23 after a specific period has elapsed from the time point when the CPU 12 at S15 requests the PC 31 to transmit the electric power of the second power amount (S21: YES). After the CPU 12 at S15 requests the PC 31 to transmit the electric power of the second power amount, when a new print job (i.e., the print job not received by the CPU 12 at the time point when the CPU 12 requests the PC 31 to transmit the electric power of the second power amount) is received from the PC 31 (S22: YES), the CPU 12 may determine whether the battery remaining amount is greater than or equal to the particular amount X (S23), without determining, as in the processing at S21, whether the specific period has elapsed from the time point when the CPU 12 at S15 requests the PC 31 to transmit the electric power of the second power amount. After the CPU 12 requests the PC 31 to transmit the electric power of the second power amount (S15), when the battery 27 is fully charged, the CPU 12 may request the PC 31 to transmit the electric power of the fourth power amount less than the second power amount, without determining, as in the processing at S23, whether the battery remaining amount is greater than or equal to the particular amount X. After the CPU 12 requests the PC 31 to transmit the electric power of the second power amount (S15), when the battery 27 is not fully charged, the CPU 12 may request the PC 31 to transmit the electric power of the third power amount greater than the second power amount, without determining, as in the processing at S23, whether the battery remaining amount is greater than or equal to the particular amount X.

It is noted that requesting the PC 31 to transmit electric power of an amount greater than or equal to the amount of the electric power consumed in the self-discharge of the battery 27 may mean that the ROM 14, for example, in advance stores the amounts greater than or equal to the amount of the electric power consumed in the self-discharge of the battery 27, as the first to fourth power amounts W1-W4, and the CPU 12 requests the PC 31 to transmit electric power of one of the first to fourth power amounts W1-W4 as the amount greater than or equal to the amount of the electric power consumed in the self-discharge of the battery 27. Here, the amount of the electric power indicates a combination of a voltage value and a current value, for example. The amount of the electric power may indicate a range of the voltage value and a range of the current value. The amount of the electric power is, for example, indicated by the power profile defined according to the USB Power Delivery standard. It is noted that the amount of the electric power consumed in the self-discharge of the battery 27 is less than or equal to each of the first to fourth power amounts W1-W4 in the above-described embodiment but may be greater than or equal to the first power amount W1 and less than or equal to each of the second to fourth power amounts W2-W4. In this case, in response to receiving a notification indicating reduction in the electric power from the PC 31, the CPU 12 requests the PC 31 to transmit the electric power of any of the second to fourth power amounts W2-W4. In the case where the PC 31 rejects the request of any of the second to fourth power amounts W2-W4, the CPU 12 requests the PC 31 to transmit the electric power of the first power amount W1.

Figure 6:
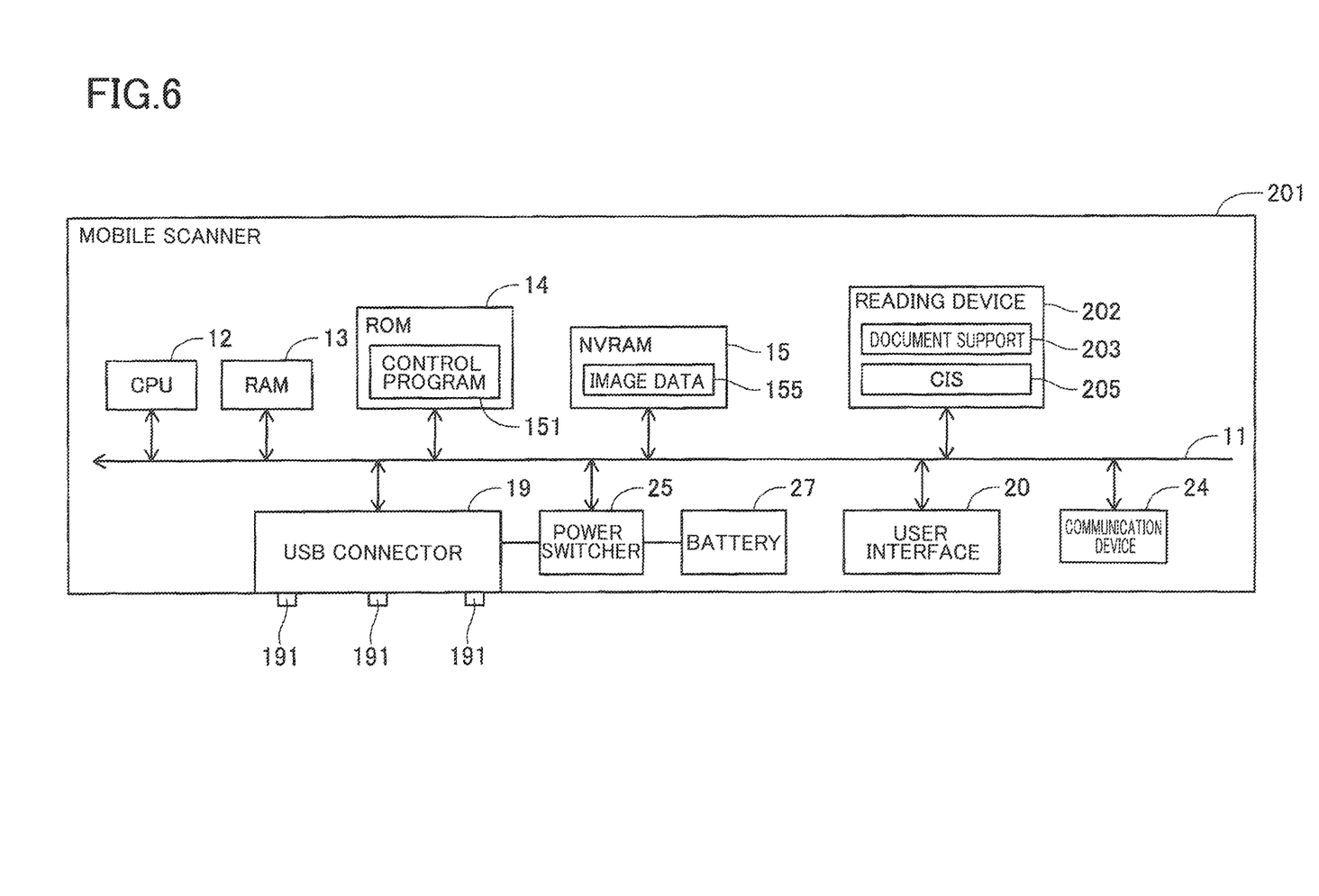
FIG. 6 is a block diagram illustrating an electric configuration of a mobile scanner according to another embodiment.

The storage location of the control program 151 is not limited to the ROM 14 and may be a storage medium readable by other computers. One example of the storage medium is a recording medium such as a RAM, a hard disk, a CD-ROM, and a DVD-ROM. While the CPU 12 is employed for the controller in the above-described embodiment, the present disclosure is not limited to this configuration. For example, the controller may be specific hardware such as application-specific integrated circuits (ASICs). The controller may be operated by processings executed by software and processings executed by hardware, for example. While the mobile printer 1 is employed for the information processing apparatus in the above-described embodiment, the present disclosure is not limited to this configuration. For example, the information processing apparatus may be any of a label printer, a copying machine, a facsimile machine, and a scanning machine. For example, as illustrated in FIG. 6, a mobile scanner may be employed for the information processing apparatus. It is noted that the same reference numerals as used in the above-described embodiment are used to designate the corresponding elements in the following description, and an explanation of which is dispensed with.

As illustrated in FIG. 6, a mobile scanner 201 includes a reading device 202 instead of the image forming device 16 in the configuration of the printer 1 illustrated in FIG. 1. The mobile scanner 201 is operable by electric power supplied from the battery 27 serving as a power source and is portably usable at various places as a scanner. The reading device 202 includes a document support 203 and a contact image sensor (CIS) 205. The reading device 202 moves the CIS 205 with respect to a document placed on the document support 203, to read an image from the document. The reading device 202 creates the image data 155 based on the read image. The mobile scanner 201 obtains a job relating to image processing from the PC 31 (see FIG. 2) connected to the USB connector 19, for example. This job is a reading job for instructing the mobile scanner 201 to create the image data 155. When the reading job is obtained from the PC 31, the CPU 12 controls the reading device 202 to read an image on the document, creates the image data 155, and transmits the created image data 155 to the PC 31. In the mobile scanner 201 configured as described above, the CPU 12 is capable of executing the charging control illustrated in FIGS. 4 and 5 to reduce an amount of reduction in the battery remaining amount due to self-discharge of the battery 27. That is, it is possible to achieve the same effects as achieved in the above-described embodiment.

In the above-described embodiment, at least when image data relating to the print job is being received from the PC 31, the CPU 12 may at S15 in FIG. 4 sets, as the second power amount W2, an amount of the electric power which is greater than or equal to an amount obtained by adding the power consumption amount required for execution of the print job, to the amount of the electric power consumed in the self-discharge of the battery 27. Here, in the case of the mobile scanner 201, the CPU 12 not only receives the reading job from the PC 31 and executes the reading job but also executes the processing for sending the PC 31 the image data 155 created in the reading processing. At least when the image data 155 in the reading job is being transmitted to the PC 31, for example, the CPU 12 may set, as the second power amount W2, an amount of the electric power which is greater than or equal to an amount obtained by adding a power consumption amount required for execution of the reading job, e.g., a power consumption amount required for the transmitting processing, to the amount of the electric power consumed in the self-discharge of the battery 27, for example. This configuration enables the CPU 12 to continue securing the electric power required for execution of the reading job, not only at creation of the image data 155 but also when the CPU 12 is transmitting the image data 155 to the PC 31.

The CPU 12 transmits the image data 155 created based on the reading job, to the PC 31 via the USB connector 19, for example. This configuration enables to the CPU 12 to continue securing the electric power required for execution of the reading job, when the image data 155 is being transmitted to the PC 31 connected to the USB connector 19.

The information processing apparatus according to the present disclosure is not limited to mobile information processing apparatuses and may be non-mobile information processing apparatuses. The information processing apparatus may be multi-function peripherals having a printing function, a copying function, a scanner function, and a facsimile function. Accordingly, the job in the present disclosure is not limited to the print job and may be jobs for other image processings such as a job for instructing execution of copying, a job for instructing execution of facsimile transmission and receiving, and a job for instructing execution of scanning.

The fourth power amount W4 is the default power amount defined according to USB 2.0 in the above-described embodiment but may be a default power amount defined according to USB 3.0 (voltage: 5 V, current: 900 mA, power: 4.5 W). The first to fourth power amounts W1-W4 may be different from those in the above-described embodiment, and voltage (V), current (A), and power (W) may be set for the first to fourth power amounts W1-W4 as follows:

W1: 5 V, 2 A, 10 W;
W2: 12 V, 1.5 A, 18 W;
W3: 12 V, 3 A, 36 W
W4: 20 V, 3 A, 60 W

What is claimed is:

1. An information processing apparatus, comprising:
  an interface;
  a battery; and
  a controller configured to:
    determine whether the information processing apparatus receives a reduction notification from an external device via the interface in a state in which the interface is currently receiving the electric power of a first power amount from the external device, the reduction notification indicating reduction in the electric power from the external device, the information processing apparatus receiving the reduction notification before a timing when the electric power is reduced from the first power amount that is currently supplied from the external device to a power amount that is less than the first power amount; and
    request the external device via the interface to supply the electric power of a second power amount when the controller determines that the information processing apparatus receives the reduction notification in the state in which the interface is currently receiving the electric power of the first power amount from the external device, the second power amount being less than the first power amount, the second power amount being greater than or equal to an amount of the electric power consumed in self-discharge of the battery;
    determine whether the battery is fully charged after requesting the external device to supply the electric power of the second power amount; and
    request the external device to supply the electric power of an amount less than the second power amount when the controller determines that the battery is fully charged.

2. The information processing apparatus according to claim 1, further comprising an image processor configured to execute a job,
  wherein the controller is configured to, when the image processor is executing the job, request the external device to supply the electric power of the second power amount via the interface, the second power amount being greater than or equal to an amount of the electric power which is obtained by adding a power consumption amount required for execution of the job to the amount of the electric power consumed in the self-discharge of the battery.

3. The information processing apparatus according to claim 1, further comprising a print engine, the print engine being configured to print an image on a sheet to execute a print job,
wherein the controller is configured to, when the controller executes the print job by the print engine, request the external device to supply the electric power of the second power amount via the interface, the second power amount being greater than or equal to an amount of the electric power which is obtained by adding a power consumption amount required for execution of the print job to the amount of the electric power consumed in the self-discharge of the battery.

4. The information processing apparatus according to claim 3, wherein the controller is configured to receive the print job from the external device via the interface.

5. The information processing apparatus according to claim 2, further comprising a scan engine, the scan engine being configured to scan an image from a document to execute a scan job,
wherein the controller is configured to, when the controller executes the scan job by the scan engine, request the external device to supply the electric power of the second power amount via the interface, the second power amount being greater than or equal to an amount of the electric power which is obtained by adding a power consumption amount required for execution of the scan job to the amount of the electric power consumed in the self-discharge of the battery.

6. The information processing apparatus according to claim 5, wherein the controller is configured to receive the scan job from the external device via the interface.

7. The information processing apparatus according to claim 2, wherein the controller is configured to:
after requesting the external device to supply the electric power of the second power amount, determine whether a remaining battery power is greater than or equal to a predetermined amount;
when the controller determines that the remaining battery power is greater than or equal to the predetermined amount, request the external device to supply the electric power of a third power amount, the third amount being less than the first power amount and greater than the second power amount, and
when the controller determines that the remaining battery power is less than the predetermined amount, request the external device to supply the electric power of the first power amount.

8. The information processing apparatus according to claim 2, wherein the controller is configured to:
determine whether the job received from the external device is being executed by the image processor;
when the controller determines that the job received from the external device is being executed by the image processor, determine whether execution of the job is completed; and
when the controller determines that the execution of the job is completed, determine whether a remaining battery power that is a remaining amount of the battery is greater than or equal to a predetermined amount.

9. The information processing apparatus according to claim 2,
wherein the controller is configured to:
determine whether a new job is received before a particular period has elapsed after the reduction notification is received; and
when the controller determines that the new job is received before the particular period has elapsed, determine whether a remaining battery power that is a remaining amount of the battery is greater than or equal to a predetermined amount.

10. The information processing apparatus according to claim 2, wherein the controller is configured to, after requesting the external device to supply the electric power of the second power amount and after execution of the job received from the external device is completed, determine whether a remaining battery power is greater than or equal to a predetermined amount.

11. The information processing apparatus according to claim 2, wherein the controller is configured to, after a specific period has elapsed from a time point when the controller requests the external device to supply the electric power of the second power amount, determine whether a remaining battery power that is a remaining amount of the battery is greater than or equal to a predetermined amount.

12. The information processing apparatus according to claim 2, wherein the controller is configured to, when a new job is received from the external device after requesting the external device to supply the electric power of the second power amount, determine whether a remaining battery power that is a remaining amount of the battery is greater than or equal to a predetermined amount.

13. The information processing apparatus according to claim 1, wherein the amount less than the second power amount corresponds to an amount of the electric power for trickle charge of the battery.

14. The information processing apparatus according to claim 1, wherein the controller is configured to:
when the controller determines that the battery is not fully charged, request the external device to supply the electric power of a third power amount that is an amount of the electric power greater than the second power amount.

15. The information processing apparatus according to claim 1, wherein the interface is a USB (Universal Serial Bus) connector.

16. A method of controlling an information processing apparatus, the information processing apparatus comprising an interface and a battery,
wherein the method comprises:
determining whether the information processing apparatus receives a reduction notification from an external device via the interface in a state in which the interface is currently receiving the electric power of a first power amount from the external device, the reduction notification indicating reduction in the electric power from the external device, the information processing apparatus receiving the reduction notification before a timing when the electric power is reduced from the first power amount that is currently supplied from the external device to a power amount that is less than the first power amount; and
request the external device via the interface to supply the electric power of a second power amount when it is determined that the information processing apparatus receives the reduction notification in the state in which the interface is currently receiving the electric power of the first power amount from the external device, the second power amount being less than the first power amount, the second power amount being greater than or equal to an amount of the electric power consumed in self-discharge of the battery;.

determining whether the battery is fully charged after requesting the external device to supply the electric power of the second power amount; and requesting the external device to supply the electric power of an amount less than the second power amount when the controller determines that the battery is fully charqed.

17. A non-transitory storage medium storing a program executable by a computer of an information processing apparatus, the information processing apparatus comprising an interface and a battery, wherein when executed by the computer, the program causes the information processing apparatus to:

determine whether the information processing apparatus receives a reduction notification from an external device via the interface in a state in which the interface is currently receiving the electric power of a first power amount from the external device, the reduction notification indicating reduction in the electric power from the external device, the information processing apparatus receiving the reduction notification before a timing when the electric power is reduced from the first power amount that is currently supplied from the external device to a power amount that is less than the first power amount; and request the external device via the interface to supply the electric power of a second power amount when the information processing apparatus determines that the information processing apparatus receives the reduction notification in the state in which the interface is currently receiving the electric power of the first power amount from the external device, the second power amount being less than the first power amount, the second power amount being greater than or equal to an amount of the electric power consumed in self-discharge of the battery;

determine whether the battery is fully charqed after requestinq the external device to supply the electric power of the second power amount; and request the external device to supply the electric power of an amount less than the second power amount when the controller determines that the battery is fully charged.

* * * * *